(12) United States Patent
Ishijima et al.

(10) Patent No.: US 7,810,407 B2
(45) Date of Patent: Oct. 12, 2010

(54) FIXED TYPE CONSTANT VELOCITY JOINT

(75) Inventors: Minoru Ishijima, Iwata (JP); Kenta Yamazaki, Iwata (JP)

(73) Assignee: NTN Corporation, Osaka-fu (JP)

( * ) Notice: Subject to any disclaimer, the term of this patent is extended or adjusted under 35 U.S.C. 154(b) by 475 days.

(21) Appl. No.: 10/587,073

(22) PCT Filed: Dec. 28, 2004

(86) PCT No.: PCT/JP2004/019849

§ 371 (c)(1),
(2), (4) Date: Apr. 27, 2007

(87) PCT Pub. No.: WO2005/075845

PCT Pub. Date: Aug. 18, 2005

(65) Prior Publication Data

US 2008/0051203 A1    Feb. 28, 2008

(30) Foreign Application Priority Data

Feb. 6, 2004    (JP) .............................. 2004-031101

(51) Int. Cl.
*B62D 1/16* (2006.01)

(52) U.S. Cl. ......................... 74/492; 464/906
(58) Field of Classification Search ................. 464/145, 464/906; 74/492
See application file for complete search history.

(56) References Cited

U.S. PATENT DOCUMENTS

2003/0083135 A1    5/2003    Yamazaki et al.

FOREIGN PATENT DOCUMENTS

| JP | 63-23027 | 1/1988 |
|---|---|---|
| JP | 8-40005 | 2/1996 |
| JP | 8-121491 | 5/1996 |
| JP | 2001-330054 | 11/2001 |
| JP | 2003-130082 | 5/2003 |

*Primary Examiner*—Greg Binda
(74) *Attorney, Agent, or Firm*—Wenderoth, Lind & Ponack, L.L.P.

(57) ABSTRACT

A fixed type constant velocity joint has a plurality of torque transmitting ball tacks, the torsional angle at the input torque 0 Nm in a torque-torsional angle diagram be approximately 0. Further, the torsional rigidity in the vicinity of input torque 0 Nm in the torque-torsional angle diagram is placed in a range of 1.5 Nm/deg to 6 Nm/deg.

4 Claims, 8 Drawing Sheets

FIG. 2A
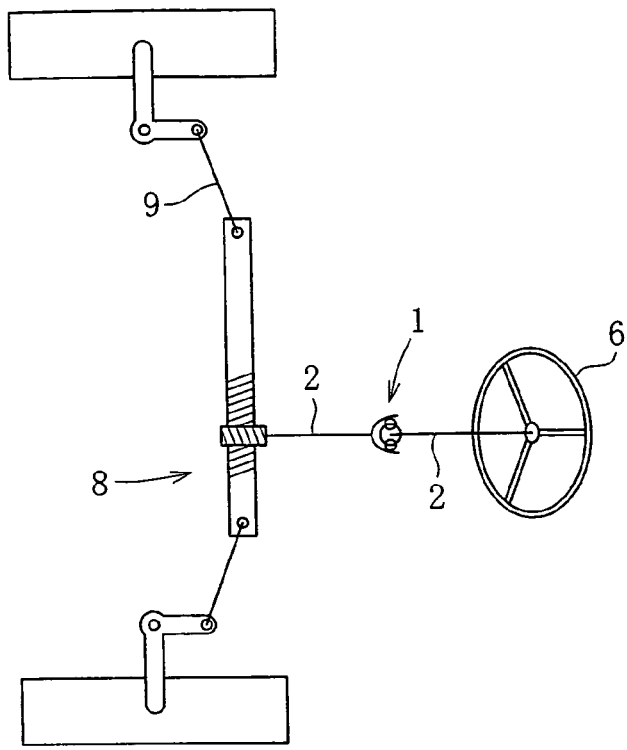
FIG. 2B
FIG. 2C
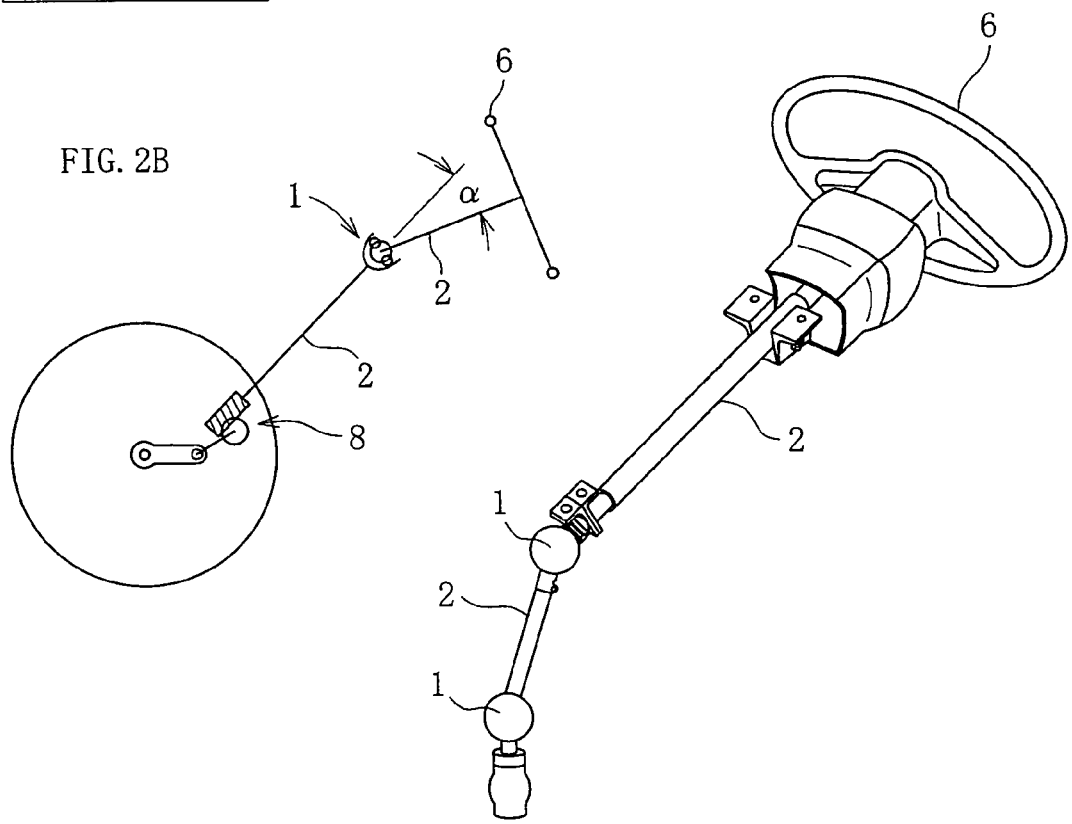

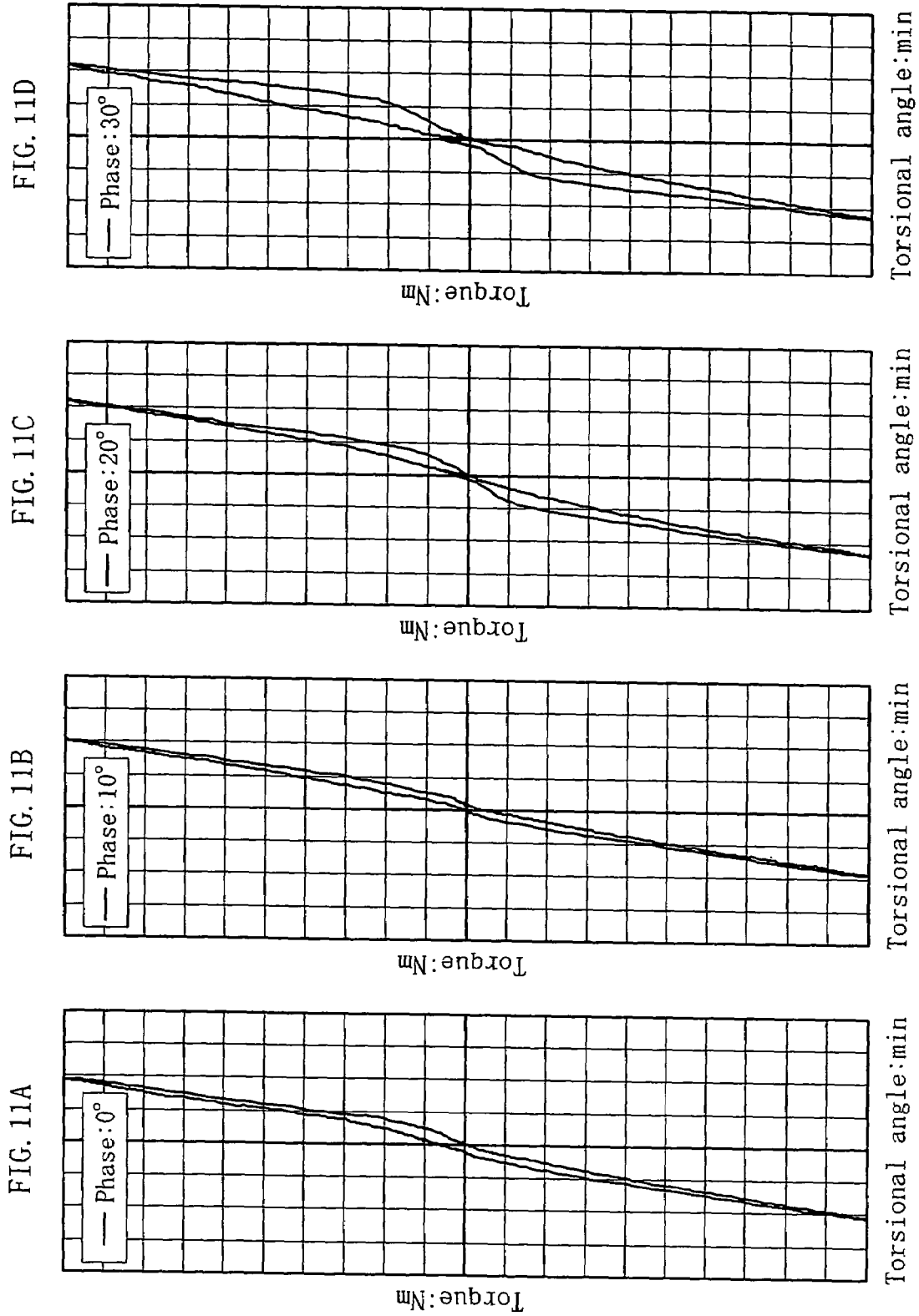

FIXED TYPE CONSTANT VELOCITY JOINT

TECHNICAL FIELD

The present invention relates to a fixed type constant velocity joint which can be utilized in not only steering devices but also the power transmission systems of automobiles, such as drive shafts and propeller shafts, and also in the power transmission systems of various industrial machines.

BACKGROUND ART

Constant velocity joints are classified roughly into two types; the fixed type which allows only angular displacement between input and output shafts, and the slide type which allows angular displacement and axial displacement, each type being selected according to application and use conditions. Widely used as fixed type constant velocity joints are the Rzeppa type (hereinafter referred to as "BJ") and undercut free type (hereinafter referred to as "UJ"). The BJ and UJ each comprises an outer ring having a plurality of curved ball grooves in the inner periphery, an inner ring having a plurality of curved ball grooves in the outer periphery, balls incorporated between the ball grooves of the outer ring and the ball grooves of the inner ring, and a cage for holding the balls. The ball groove center of the outer ring is positioned on the outer ring opening side with respect to the outer ring inner spherical surface center and the ball groove center of the inner ring is positioned on the outer ring innermost side with respect to the inner ring outer spherical surface center, the ball groove centers being offset axially by an equal distance in opposite directions. Therefore, the ball tracks defined by ball grooves of the outer and inner rings are in the form of a wedge gradually contracting or expanding from one to the other of the axial direction of the joint. In the BJ the entire region of each ball groove is curved, while in the UJ, one end of each ball groove straight is parallel with the axis.

Generally, a steering joint for automobiles uses two or more cardan joints. Since this joint provides ununiform velocity if used by itself, two or more joints are disposed to ensure that variation components cancel each other so as to secure uniform velocity property. For this reason, a problem exists in that the degree of freedom of design of vehicles is decreased. The use of constant velocity joints, which can secure uniform velocity property at optional angles, as steering shaft joints makes it possible to increase the degree of freedom of the design of vehicles; however, since constant velocity joints have a large play in the direction of rotation, it is feared that such play may cause degradation of steering feel or cause abnormal sounds, in the vicinity of vehicle straight travel. To solve this, Japanese Unexamined Patent Publication No. 2003-130082 proposes that a pre loading means be provided in the constant velocity joint to reduce track clearances. The track clearances mentioned herein means clearances between the ball tracks and the torque transmitting balls or more specifically clearances between the ball grooves of the outer ring and the torque transmitting balls and clearances between the inner ring ball grooves and the torque transmitting balls.

In fixed type constant velocity joints, there exist track clearances from the functional and processing aspect, and there also exist clearances between the inner spherical surface of the outer ring and the outer spherical surface of the cage and between the outer spherical surface of the inner ring and the inner spherical surface of the cage. The presence of these clearances makes it possible to fix one of the inner and outer rings and move the other radially or axially in the neutral state of the joint. The amount of movement at this time is called a radial clearance or an axial clearance depending on the direction of movement. These clearances largely influence the circumferential play (rotational backlash) between the inner and outer rings; specifically, the larger the track clearances, the larger the rotational backlash. For this reason, a certain degree of rotational backlash is unavoidable, so that this kind of fixed type constant velocity joint has not yet been generally employed in situations where rotational backlash should be avoided as in the steering devices of automobiles, for example.

The invention disclosed in Japanese Unexamined Patent Publication No. 2003-130082 is a fixed type constant velocity joint intended to reduce the rotational backlash; however, it has the possibility that hysteresis may increase depending on the conditions for attachment to vehicles and detract the steering stability in the vicinity of straight travel of vehicles.

SUMMARY OF THE INVENTION

A major object of the invention is to eliminate the circumferential play (rotational backlash) in fixed type constant velocity joints so as to improve the feeling characteristics.

The invention provides a fixed type constant velocity joint comprising an outer ring formed with axially extending ball grooves at circumferentially equispaced positions on the inner spherical surface, an inner ring formed with axially extending ball grooves at circumferentially equispaced positions on the outer spherical surface, balls disposed in wedge-shaped ball tracks defined by the ball grooves of the outer and inner rings and a cage interposed between the inner spherical surface of the outer ring and the outer spherical surface of the inner ring to hold the balls, the fixed type constant velocity joint being characterized in that the torsional angle in a torque-torsional angle diagram is approximately 0 at the time of input torque 0 Nm.

Further, the invention provides a fixed type constant velocity joint comprising an outer ring formed with axially extending ball grooves at circumferentially equispaced positions on the inner spherical surface, an inner ring formed with axially extending ball grooves at circumferentially equispaced positions on the outer spherical surface, balls disposed in wedge-shaped ball tracks defined by the ball grooves of the outer and inner rings and a cage interposed between the inner spherical surface of the outer ring and the outer spherical surface of the inner ring to hold the balls, the fixed type constant velocity joint being characterized in that the torsional rigidity in the vicinity of input torque 0 Nm in the torque-torsion diagram is put in a range of 1.5 Nm/deg to 6 Nm/deg.

The fixed type constant velocity joints may be arranged such that the inner ring is provided with a pressing section which axially applies an elastic pressing force and the cage is provided with a receiving section which receives a pressing force from the pressing section. Further, the ball groove center of the outer ring is positioned on the opening side with respect to the inner spherical surface center. Consequently, the ball groove center of the inner ring is positioned on the innermost side beyond the outer ring opening with respect to the outer spherical surface center. Having such mechanism results in the ball tracks, which are defined by the ball grooves of the outer and inner rings, taking a wedge shape which spreads toward the opening side of the outer ring, so that when the inner ring is axially displaced to the outer ring opening side by the pressing force, the track clearances are reduced to enable prevention of rotational backlash.

Specifically, a pressing section 52 is provided in a shaft 2 which is serration joined to an inner ring 20, while a receiving section 58 is provided in a cage 40. Elastic abutment between the pressing section 52 and the receiving section 58 presses the inner ring 20 toward the opening side of an outer ring 10 (see FIGS. 3 and 4). Since the ball grooves 24 of the inner ring 20 are shaped to contract toward the innermost side of the outer ring 10, this movement reduces the radial clearances of the ball tracks to prevent the occurrence of rotational backlash.

In this connection, generally in fixed type constant velocity joints, from the functional and processing aspect, there also exists clearances between the inner spherical surface of the outer ring and the cage outer spherical surface and between the outer spherical surface of the inner ring and the cage inner spherical surface. In the latter case if the axial clearance defined by the spherical clearance between the outer spherical surface of the inner ring and the cage inner spherical surface is smaller than the axial clearance stemming from the track clearance, the inner ring and the cage will abut against each other before the axial clearance stemming from the track clearance is completely reduced; thus, there is a limit to the further reduction of the axial clearance stemming from the track clearance. Therefore, it is desired that the axial clearance between the inner ring and the cage be larger than the axial clearance stemming from the track clearance.

The fixed type constant velocity joint of the invention can be employed in various steering devices including electric power steering devices, contributing to improvement in steering stability for automobiles mounted with the steering devices. The fixed type constant velocity joint of the invention is also applicable not only to steering devices but also to drive shafts and propeller shafts. In addition, steering devices may be electric power steering devices (EPS) which impart auxiliary force by a motor or hydraulic power steering devices.

According to the invention, the circumferential play (backlash) in fixed type constant velocity joints is eliminated to improve feeling characteristic.

BRIEF DESCRIPTION OF THE DRAWINGS

FIG. 2A is a plan view of a steering device;

FIG. 2B is a side view of the steering device;

FIG. 2C is a perspective view of the steering device;

FIGS. 11A to 11D show torque-torsional angle diagrams made by changing the phase in increments of 10°.

DETAILED DESCRIPTION OF

Figure 1A:
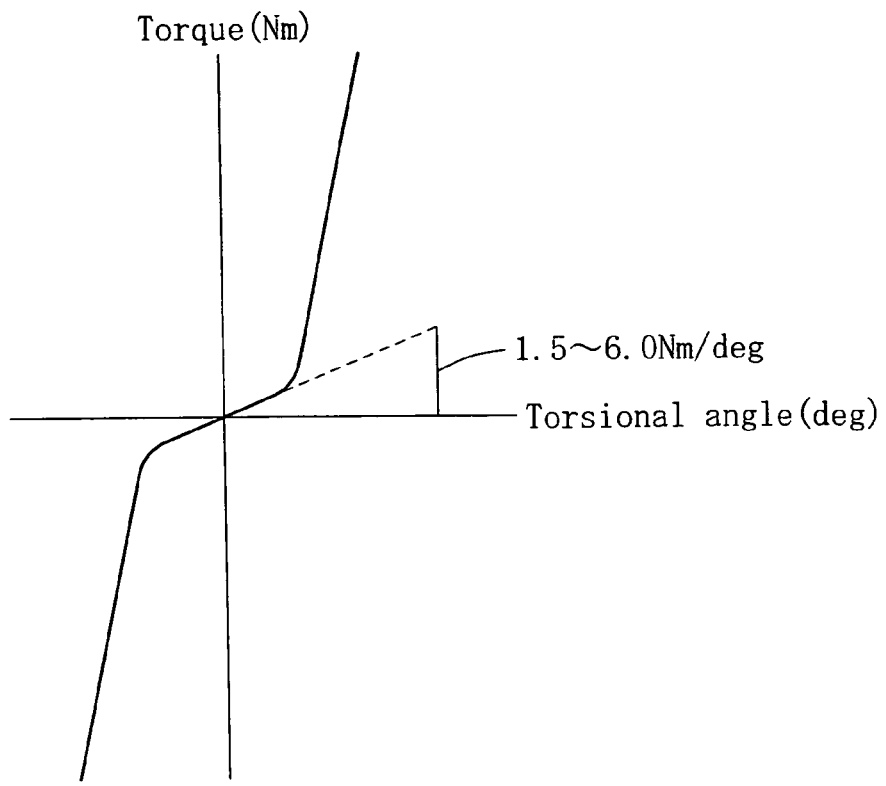
FIG. 1A is a torque-torsional diagram showing an embodiment of the invention.

Embodiments of the invention will now be described.

First, a brief description of a steering device will be given. As shown in FIGS. 2A through 2C, a steering device is so designed that rotational motion of a steering wheel 6 is transmitted to a steering gear 8 through a steering column consisting of one or a plurality of steering shafts 2, thereby converting it into the reciprocating motion of a tie rod 9. In the case where the steering shafts 2 cannot be disposed in a straight line in consideration of the vehicle space or the like, one or a plurality universal joints 1 will be disposed between the steering shafts 2 to ensure that accurate rotational motion is transmitted to the steering gear 8 even with the steering shafts 2 being bent. A fixed type constant velocity joint is used in place of the universal joint 1. The character $\alpha$ in FIG. 2B denotes the bending angle of the joint, and a large angle exceeding 30° can be set as the bending angle $\alpha$.

Figure 3:
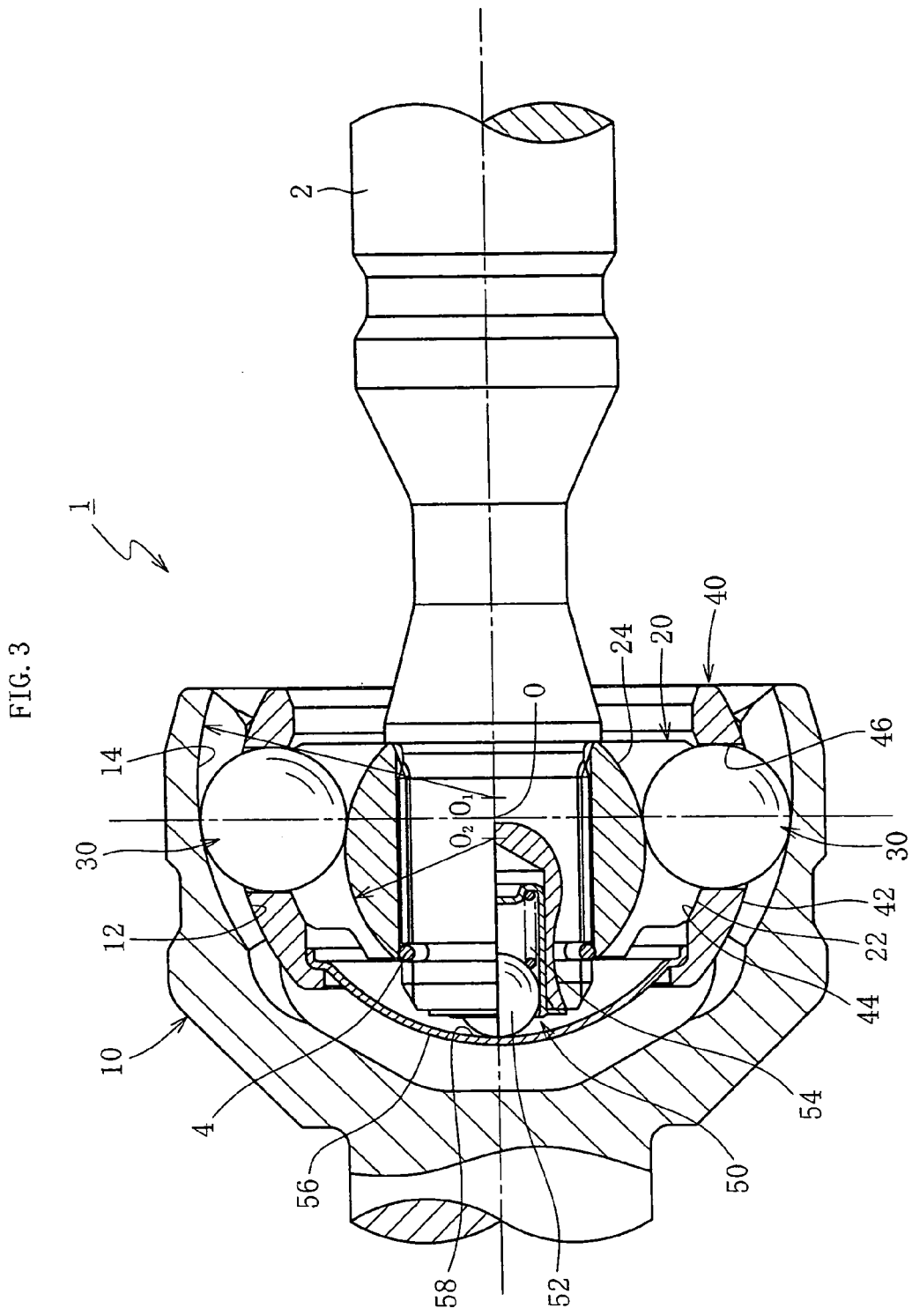
FIG. 3 is a longitudinal sectional view of a fixed type constant velocity joint.

Next, a fixed type constant velocity joint will be described. FIGS. 3 through 6 show by way of example a Rzeppa type joint (BJ), which is a kind of fixed type constant velocity joint. As shown in FIG. 3, this type of constant velocity joint 1 comprises an outer joint member 10, an inner joint member 20, torque transmitting balls 30, and a cage 40, as main components. The outer joint member 10 is connected to an input shaft or an output shaft, while the inner joint member 20 is connected to an input shaft or an output shaft. Here, the inner joint member 20 is serration-joined to the shaft 2.

The outer joint member 10 is the form of a cup opened at one end and having axially extending ball grooves 14 formed at circumferentially equispaced positions on an inner spherical surface 12. The inner joint member 20 has axially extending ball grooves 24 formed at circumferentially equispaced positions on an outer spherical surface 22. the ball grooves 14 of the outer joint member 10 and the ball grooves 24 of the inner joint member 20 are paired to form ball tracks which wedge-wise contract or expand from one to the other of the axial direction, with a single torque transmitting ball 30 incorporated in each ball track. The cage 40 is slidably interposed between the inner spherical surface 12 of the outer joint member 10 and the outer spherical surface 22 of the inner joint member 20, and each torque transmitting ball 30 is received in respective one of the pockets 46 of the cage 40.

The outer spherical surface 42 of the cage 40 makes spherical contact with the inner spherical surface 12 of the outer joint member 10, while the inner spherical surface 44 of the cage 40 makes spherical contact with the outer spherical surface 22 of the inner joint member 20. And, the center of curvature of the inner spherical surface 12 of the outer joint member 10 and the center of curvature of the outer spherical surface 22 of the inner joint member 20 coincide with the joint center O. The center of curvature $O_1$ of the ball grooves 14 of the outer joint member 10 and the center of curvature $O_2$ of the ball grooves 24 of the inner joint member 20 are offset axially by an equal distance in opposite directions. For this reason, a ball track defined by a pair of ball grooves 14, 24 take a wedge shape contracting from the opening side to the innermost side of the outer joint member 10.

Figure 6:
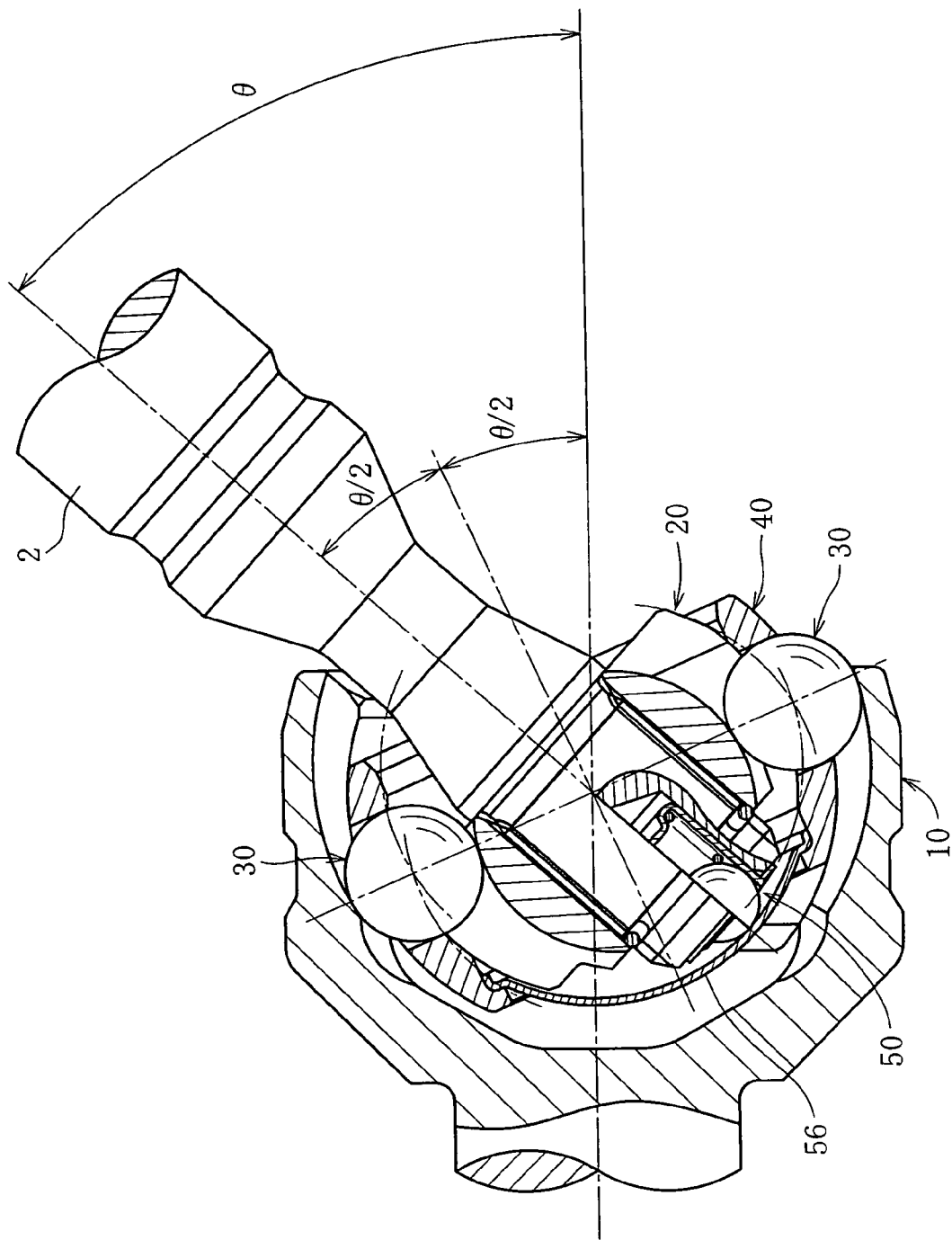
FIG. 6 is a longitudinal sectional view showing the joint taking a bending angle.

In this fixed type constant velocity joint, as shown in FIG. 6, irrespective of what working angle, namely a bending angle $\theta$, the outer and inner joint members 10 and 20 may take, the torque transmitting balls 30 are always maintained in a plane perpendicular to the bisector of the bending angle $\theta$, so that the constant velocity property of the joint is secured.

Figure 4:
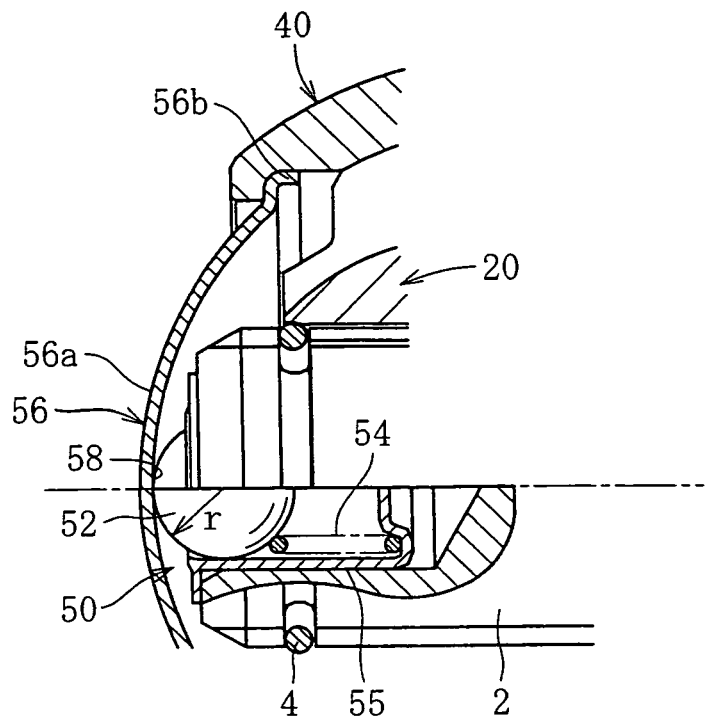
FIG. 4 is a principal enlarged view of FIG. 3.

As shown in FIG. 3, the shaft end of the shaft 2 is provided with a pressing member 50. The pressing member 50, as shown in FIG. 4, is composed of a ball serving as a pressing section 52, a compression coil spring serving as an elastic member 54, and a case 55 for assembling the pressing section 52 and elastic member 54. The elastic member 54 acts as an elastic force through the pressing section 52. Further, the pressing section 52 may be in the form of a hemisphere or in the form of a column formed at the top with a convex spherical surface. The case 55 is fixed to the front end of the shaft 2 integrally serration-joined to the inner joint member 20, by a suitable means such as press fitting or adhesive agent.

The end of the innermost side of the outer joint member 10 of the cage 40 has a receiving member 56 attached thereto. This receiving member 56 is in the form of a lid covering the end opening in the cage 40 (see FIG. 3) and is composed of a spherical section 56a in the form of a partial sphere and an attaching section 56b annularly formed in the outer periphery thereof. The inner surface of the spherical section 56a (the surface opposed to the shaft 2) is a concave spherical surface, and this concave spherical surface functions as the receiving section 58 for receiving the pressing force from the pressing section 52. The attaching section 56b is fixed to the end of the cage 40 by a suitable means such as press fitting or welding.

Figure 5:
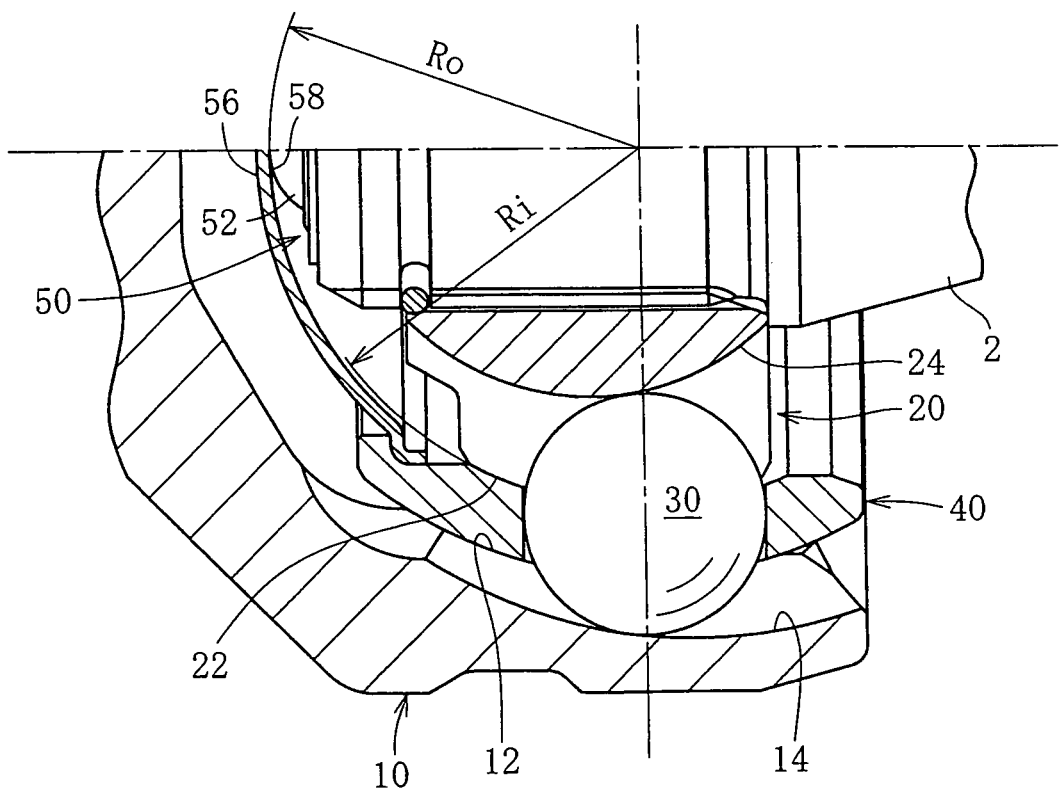
FIG. 5 is a principal enlarged view of FIG. 3.

In order to allow the pressing member 50 and receiving member 56 to smoothly slide when the joint takes a bending angle, as shown in FIG. 5, the inner diameter dimension Ro of the concave spherical surface-like receiving section 58 is made larger than the radius r (FIG. 4) of the pressing section 52 (Ro>r). Further, in order to prevent interference between the receiving member 56 and the inner joint member 20 when a bending angle θ is taken as shown in FIG. 6, the inner diameter dimension Ro of the receiving section 58 is made larger than the radius dimension Ri of the inner spherical surface 44 of the cage 40 (Ro>Ri).

In the above arrangement, when the serration shaft section of the shaft 2 and the inner joint member 20 are serration joined to each other and a snap ring 4 is mounted to completely join the two (see FIG. 3 or 4), the pressing section 52 of the pressing member 50 and the receiving section 58 of the receiving member 56 abut against each other, whereby the elastic member 54 is compressed. Thereby, the inner joint member 20 integrated with the shaft 2 is axially displaced to the opening side of the outer joint member by elastic force, which displacement, since the ball grooves 24 of the inner ring 20 are shaped to contract to the innermost side of the outer ring 10, reduces the axial clearance stemming from the track clearance, thus preventing rotational backlash.

Elimination of the rotational backlash requires that the elastic force of the elastic member 54 be set in consideration of various conditions acting on the joint-mounted state of the vehicle. For example, in the case where the self-weight of the shaft 2 acts on the elastic member 54, the self-weight and plunging force must be taken into consideration. Further, it is desirable that vibrations in the steering system be taken into consideration. By optimizing the setting of the spring force in this manner, the play can always be reduced, making it possible to avoid abnormal sound due to a clearance produced by axial or radial input.

In addition, the description given above has shown examples in which BJs are used as fixed type constant velocity joints; however, the invention is not limited thereto and can be likewise applicable to undercut free joints having a straight section in portions of the ball grooves 14 and 24 or to other fixed type constant velocity joints, achieving the same effects.

Figure 7:
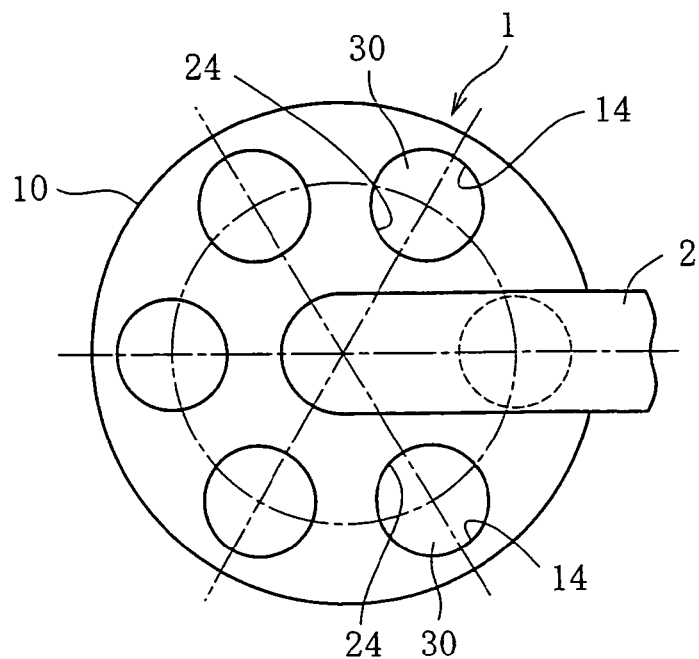
FIG. 7 is a schematic view of a steering-purpose fixed type constant velocity joint.
Figure 8:
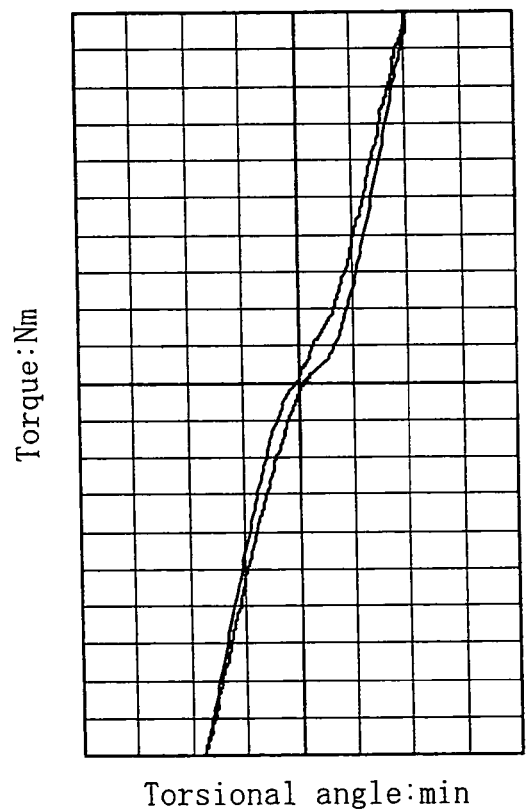
FIG. 8 is a torque-torsional angle diagram for the joint of FIG. 7.
Figure 9:
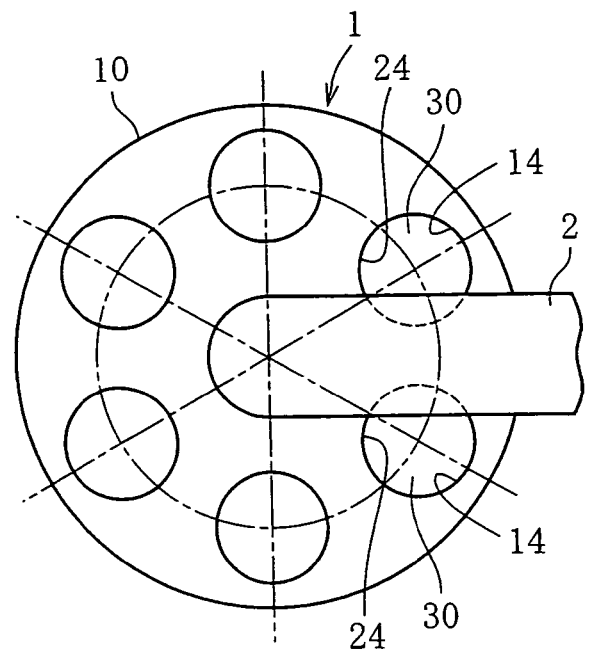
FIG. 9 is a schematic view of a steering-purpose fixed type constant velocity joint.
Figure 10:
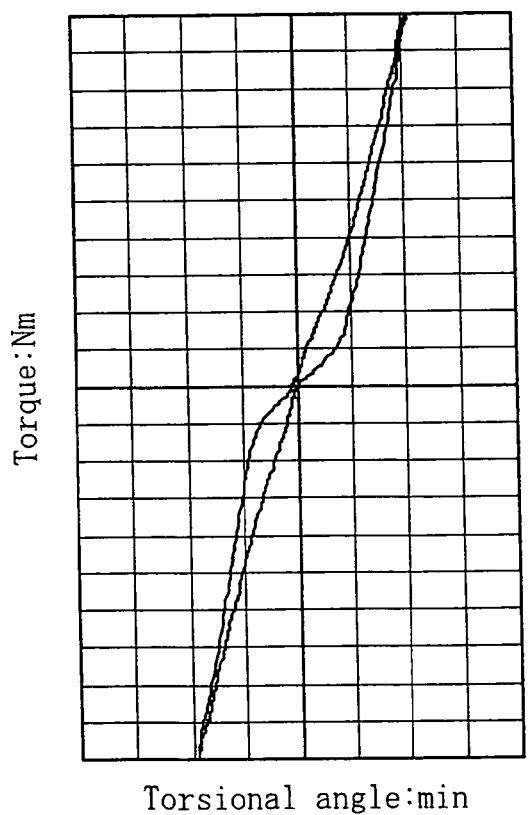
FIG. 10 is a torque-torsional angle diagram for the joint of FIG. 9.

In attaching the fixed type constant velocity joint 1 to a vehicle to serve as a steering-purpose shaft joint, it is preferable that the bend phase of the steering shaft 2 in the straight travel state of the vehicle be adjusted to be the ball groove 14, 24 direction of the constant velocity joint 1. In other words, the rotational direction phase in having the bending direction of the steering shaft 2 being in the direction of the ball groove 14, 24 coincides with the steering wheel rotational phase being such that the vehicle is in a straight travel state. Thereby, degradation of the steering stability accompanying an increase in hysteresis can be avoided. More specifically, as shown in FIG. 7, the joint is attached so that the bend phase of the steering shaft 2 in the straight travel state of the vehicle coincides with the ball groove 14, 24 direction of the constant velocity joint 1. FIG. 9 shows a comparative example in which the bending direction of the steering shaft 2 extends between the ball groove 14, 24 directions of the constant velocity joint 1. The torque-torsional angle diagrams for FIGS. 7 and 9 are shown in FIGS. 8 and 10, respectively. As is clear from these figures, the hysteresis is small (FIG. 8) when the bending direction of the steering shaft 2 is the ball groove 14, 24 direction (FIG. 7) and is large (FIG. 10) when it extends between the ball groove 14, 24 directions (FIG. 9). Such tendency is pronounced particularly when the set joint angle (a: FIG. 2B) exceeds 30°.

In the straight travel state of the vehicle, an increase in the hysteresis in the torque-torsional angle diagram for the joint influences steering wheel operability (direct feeling); therefore, it is desirable that this hysteresis be small. For this reason, by adjusting the bend phase of the steering shaft 2 in the straight travel state of the vehicle to be the ball groove direction, degradation of the steering stability accompanying an increase in hysteresis can be avoided.

FIGS. 11A to 11D show play diagrams made by changing the bend phase of the steering shaft in increments of 10° from the ball groove direction to the between-ball-grooves direction. Phase 0° (FIG. 11A) refers to the case of the ball groove direction, while phase 30° (FIG. 11D) refers to the case of extending between the ball groove directions. Comparing FIGS. 11A through 11D with each other shows that the change in hysteresis increases with 20° phase from the ball groove direction. Therefore, making the direction of the steering shaft to be not more than ±20° on a ball groove basis makes it possible to avid or mitigate the degradation of operability accompanying an increase in hysteresis.

Figure 1B:
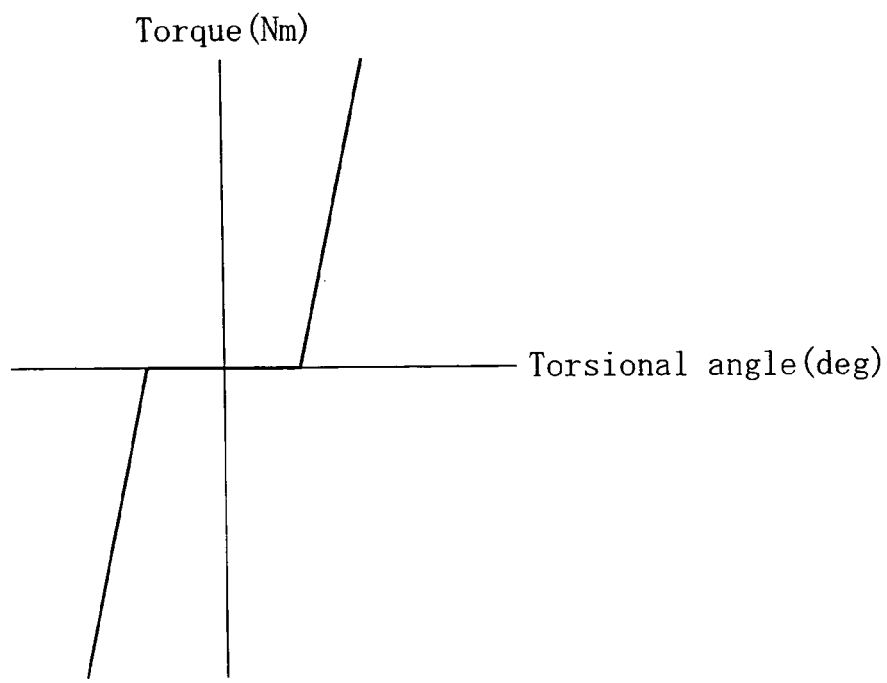
FIG. 1B is a torque-torsion diagram showing a comparative example.

Next, FIGS. 1A and 1B are schematic forms of torque-torsional angle diagrams shown in FIGS. 8, 10, and 11A to 11D, in which likewise the vertical axis indicates torque (Nm) and the horizontal axis indicates torsional angle (deg) In the case of the fixed type constant velocity joint used for steering devices, the torque in the vertical axis corresponds to the force for turning the steering wheel, while the torsional angle in the horizontal axis corresponds to the rotational angle of the steering wheel, though the torque in the torque-torsional angle diagrams is a value measured for the constant velocity joint itself, differing from the so-called steering force in a steering device mounted in an automobile. As shown in FIG. 1A, the torque-torsional angle curve is decreased in slope in the vicinity of torque o. Specifically, it is preferable that it be set in the range from 1.5 to 6.0 Nm/deg. FIG. 1B shows a comparative example in which there is a region where the slope is 0 over a given torsional angle in the vicinity of torque o. In this region, the steering wheel turns with torque o. In other words, the steering wheels turn with no resistance, a fact which is recognized as a circumferential play which degrades the feeling characteristics.

In the above description, the outer joint member and the inner joint member are substantially the same as the outer ring and the inner ring, respectively.

The invention claimed is:
1. A steering system for a vehicle, comprising:
a steering shaft; and
a fixed type constant velocity joint including
an outer joint member having an inner spherical surface and having axially extending ball grooves at circumferentially equispaced positions on the inner spherical surface;

an inner joint member having an outer spherical surface and having axially extending ball grooves at circumferentially equispaced positions on the outer spherical surface, the inner joint member being connected to the steering shaft;

balls disposed in wedge-shaped ball tracks defined by the ball grooves of the outer and inner joint members;

a cage interposed between the inner spherical surface of the outer joint member and the outer spherical surface of the inner joint member to hold the balls, a pressing section which axially applies an elastic pressing force disposed on an inner joint member side, and the cage including a receiving section which receives a pressing force from said pressing section, wherein a torsional angle of the constant velocity joint in a torque-torsional angle diagram is approximately 0 at the time an input torque of 0 Nm is applied to the steering shaft and to the inner joint member, and wherein the constant velocity joint is configured such that a rotational direction phase having a bending direction of the shaft so as to be aligned with one ball groove of the ball grooves coincides with a steering wheel rotational phase of the vehicle such that the vehicle is in a straight travel state.

2. A steering system for a vehicle as set forth in claim 1, wherein the ball tracks include an expanded side, and the elastic pressing force acts such that the inner joint member is pushed out to the expanded side of the ball tracks through the receiving section installed in the cage.

3. A steering system for a vehicle, comprising:

a steering shaft; and a fixed type constant velocity joint including an outer joint member having an inner spherical surface and having axially extending ball grooves at circumferentially equispaced positions on the inner spherical surface;

an inner joint member having an outer spherical surface and having axially extending ball grooves at circumferentially equispaced positions on the outer spherical surface, the inner joint member being connected to the steering shaft;

balls disposed in wedge-shaped ball tracks defined by the ball grooves of the outer and inner joint members;

a cage interposed between the inner spherical surface of the outer joint member and the outer spherical surface of the inner joint member to hold the balls; and a pressing section which axially applies an elastic pressing force disposed on an inner joint member side, and the cage including a receiving section which receives a pressing force from said pressing section, wherein a torsional rigidity of the constant velocity joint in the vicinity of input torque of 0 Nm applied to the steering shaft and to the inner joint member in a torque-torsional angle diagram is in a range of 1.5 Nm/deg to 6 Nm/deg, and wherein the constant velocity joint is configured such that a rotational direction phase having a bending direction of the shaft so as to be aligned with one ball groove of the ball grooves coincides with a steering wheel rotational phase of the vehicle such that the vehicle is in a straight travel state.

4. A steering system for a vehicle as set forth in claim 3, wherein the ball tracks include an expanded side, and the elastic pressing force acts such that the inner joint member is pushed out to the expanded side of the ball tracks through the receiving section installed in the cage.

* * * * *